UNITED STATES PATENT OFFICE.

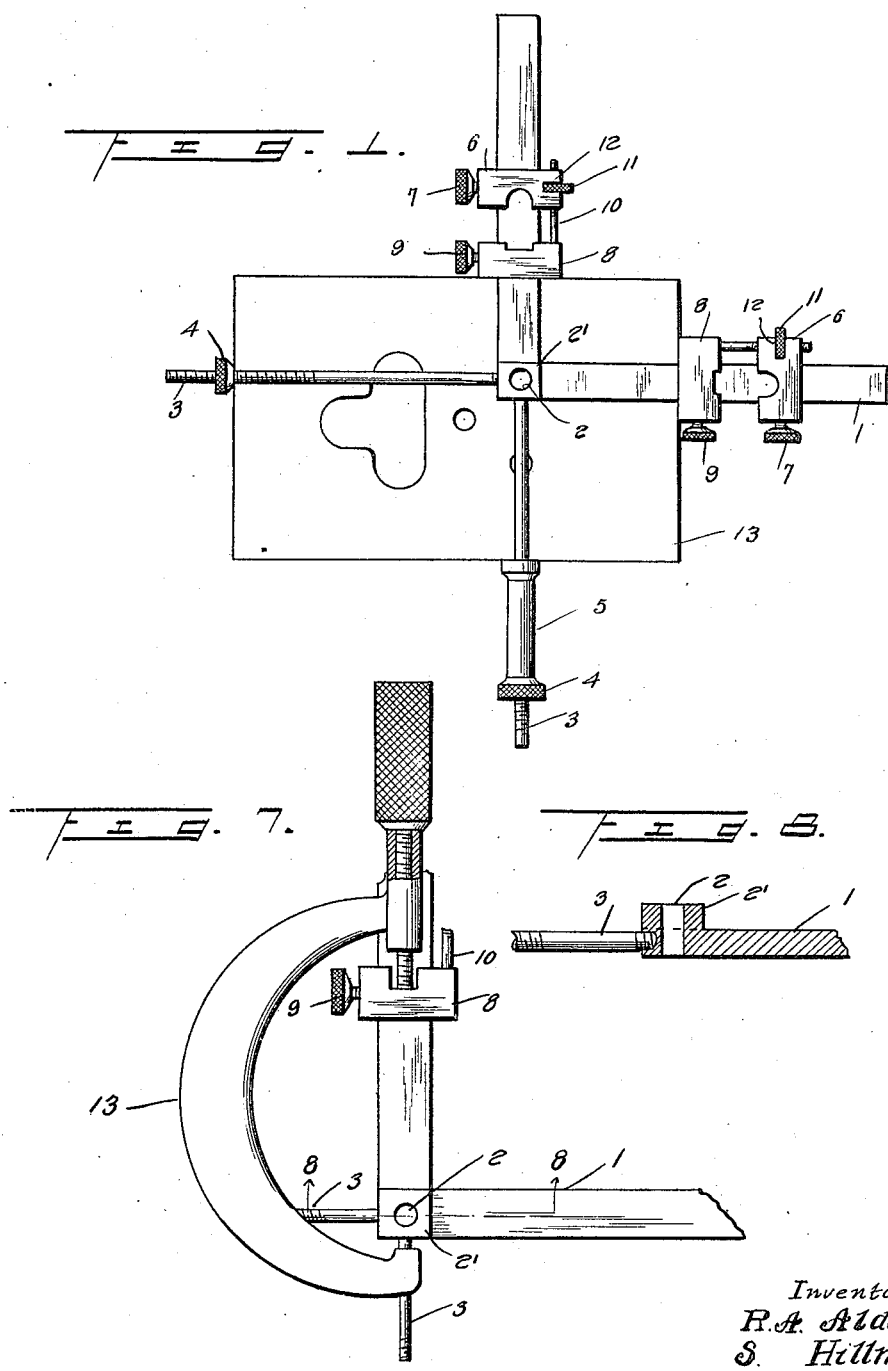

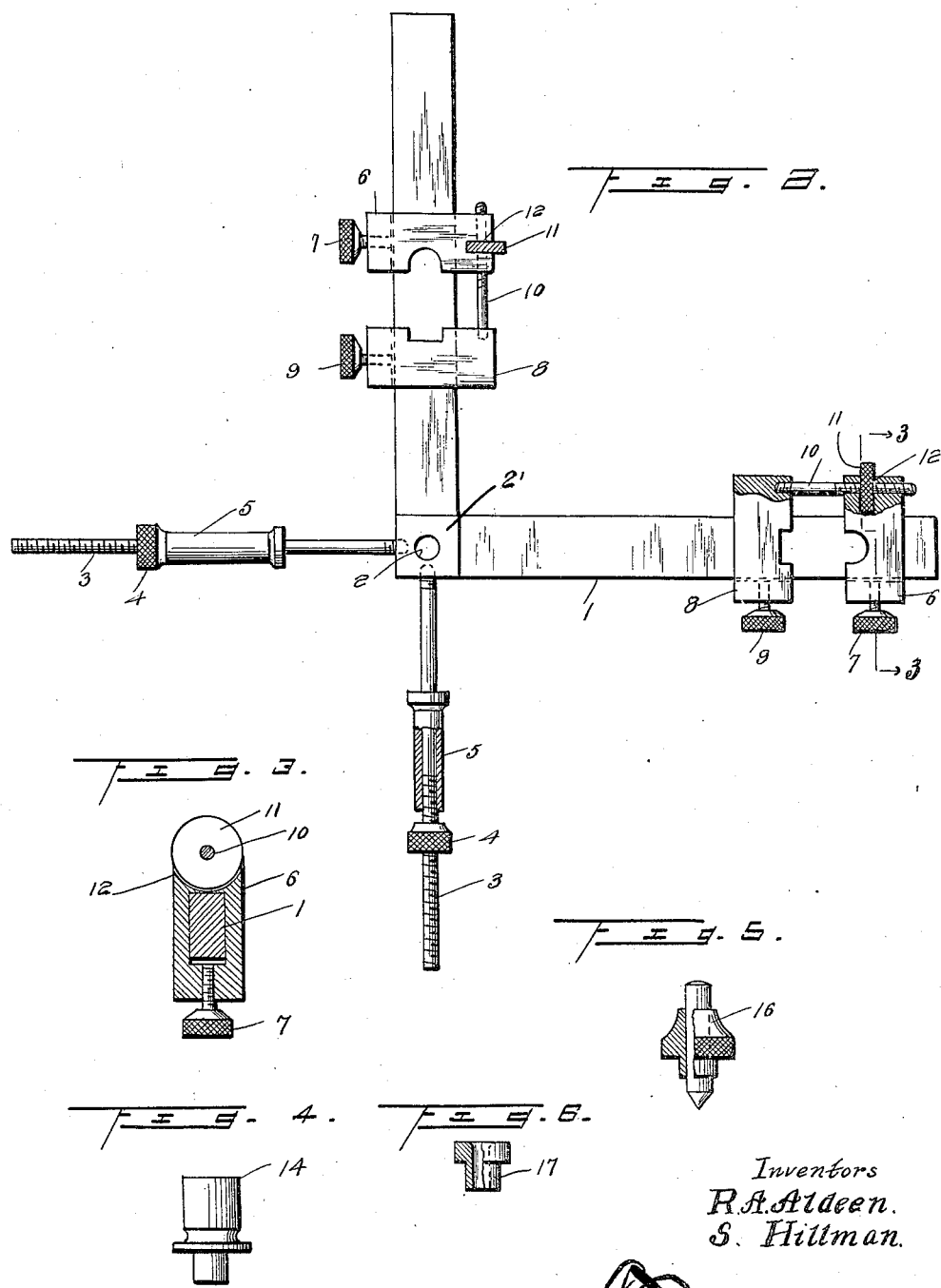

REUBEN A. ALDEEN AND SWAN HILLMAN, OF ROCKFORD, ILLINOIS.

INSTRUMENT OF PRECISION.

1,392,734.  Specification of Letters Patent.  Patented Oct. 4, 1921.

Application filed July 7, 1920. Serial No. 394,455.

*To all whom it may concern:*

Be it known that we, REUBEN A. ALDEEN and SWAN HILLMAN, citizens of the United States, residing at Rockford, in the county of Winnebago and State of Illinois, have invented certain new and useful Improvements in Instruments of Precision; and we do hereby declare the following to be a full, clear, and exact description of the invention, such as will enable others skilled in the art to which it appertains to make and use the same.

This invention relates to a measuring instrument of precision and it consists in the novel features hereinafter described and claimed.

An object of the invention is to provide an instrument of simple form adapted to be used to advantage for marking or indicating points upon a piece of work where drill holes are to be made and accurately positioned.

The instrument is intended to be used for laying off the point upon the work preparatory to placing the work upon a drill press, bench or other machine having the accessories and appliances for carrying out the drilling operation, and the instrument is intended to provide in a unitary structure means for accurately locating and establishing the drill points whereby a single instrument will supplant and take the place of numerous instruments and appliances heretofore used for accomplishing the same purpose. In order to obtain absolute accuracy and precision in the laying off of the work the instrument is intended to be used in conjunction with a micrometer or in conjunction with established micrometer measurements.

With the above objects in view the instrument comprises a rectangular member having in its corner portion a circular opening the center of which is located exactly in alinement with the median longitudinal dimension of both arms of the rectangular member. Rods are attached to the said rectangular member and their median longitudinal dimensions are precisely in alinement with the median longitudinal dimensions of the arms of the rectangular member and the center of the opening. Nuts are screw threaded upon the rods and bushings are slidably mounted thereon, and the bushings may engage against the edges of the work which is to be marked off. Blocks are adapted to be secured at adjusted positions upon the arms of the rectangular member and other blocks are slidably mounted upon the arms of the rectangular member and means connect the blocks which are mounted upon the same arm whereby the slidable blocks may be adjusted with relation to the blocks intended to be secured at fixed positions upon the arms, and the said slidable blocks are intended to be brought against the edges of the work which is to be marked or laid off. Inasmuch as there are two adjusted blocks and two bushings with their inner surfaces disposed at right angles with respect to each other the instrument is provided with four points adapted to contact four different edges of the work and consequently by properly adjusting these respective blocks and bushings and then applying the instruments to the work, the center of the opening in the rectangular member may be brought exactly over that portion of the work which is to be punched or marked. Accessories are provided and intended to be used in the opening of the rectangular member for marking the work or for direction marking tools exactly upon the work at the center of the opening in the rectangular member.

In the accompanying drawing:—

Figure 1 is a plan view of the instrument of precision applied to a piece of work.

Fig. 2 is an enlarged plan view of the instrument detached from the work.

Fig. 3 is a transverse sectional view of the same cut on the line 3—3 of Fig. 2.

Fig. 4 is a side elevation of a button which may be used upon the instrument.

Fig. 5 is a side elevation with parts in section of a punch which may be used upon the instrument.

Fig. 6 is a side elevation partly in section of a bushing which may be used upon the instrument.

Fig. 7 is a fragmentary plan view of the instrument with a micrometer applied thereto.

Fig. 8 is a detail section on the plane of line 8—8 of Fig. 7.

The instrument of precision comprises a member 1 having a central portion 2' of increased thickness and arms disposed at a right angle to each other and hereinafter referred to as the rectangular member. The member 1 is provided at its corner portion with a circular opening 2, the center of which is precisely in longitudinal alinement with the median longitudinal dimensions of the rectangular member 1. Rods 3 are attached at their inner ends to the rectangular member 1 and are in alinement with the arms of the rectangular member 1 and the center of the circular opening 2. Nuts 4 are screwed upon the outer portions of the rods 3. Bushings 5 are slidably mounted upon the intermediate portions of the rods 3 and their ends may be in contact with the inner faces of the nuts 4. Blocks 6 are mounted upon the outer portions of the arms of the rectangular member 1 and the said blocks may be secured at adjusted positions upon the said arms by means of set screws 7 which pass through the sides of the blocks and engage the edges of the arms of the member 1. Blocks 8 are slidably mounted upon the intermediate portions of the arms of the member 1 and may be secured at fixed positions upon the arms by means of set screws 9 which pass through the sides of the blocks 8 and may engage at their inner ends the edges of the member 1. Rods 10 are carried by the blocks 8 and slidably received in the blocks 6. Nuts 11 are screwed upon the rod 10 and are received in recesses 12 provided in the blocks 6. It is apparent that when the set screws 9 are loosened the nuts 11 may be turned with relation to the blocks 6 whereby the rods 10 are moved transversely to the blocks 6 and the blocks 8 are moved toward or away from the blocks 6. Thus the blocks 8 may be adjusted along the arms of the rectangular member 1 when the blocks 6 are secured at fixed positions upon the same arms. As illustrated in Fig. 1 of the drawing the instrument is applied to a piece of work and the said work is indicated at 13. The work is rectangular and the nut 4 and the inner end of the bushing 5 bear against two of the edges of the work while the inner surfaces of the blocks 8 bear against the remaining two edges of the work. By shifting the blocks 8 upon the arms of the rectangular member 1 and by adjusting the nuts 4 upon the rods 3 the center of the opening 2 may be brought exactly over that part of the work at which the drill hole is to be made and by using a micrometer 13, as shown in Fig. 7, the blocks and the bushings may be so adjusted that the center of the opening 2 is precisely over the center of the proposed drill hole. A measuring button 14 may be inserted in the opening 2 to establish the accuracy of the measurement and its application to the work. This is intended to be used when the instrument is set in accord with micrometer measurement. When it is desired to make the punch marks on the work the punch 16 may be inserted through the opening 2 with its pointed end upon the work and then the upper end of the punch 6 is struck with a hammer in the usual manner to make the marks upon the work. If desired a bushing 17 may be inserted in the opening 2 and a drill (not shown) may be inserted through the opening of the bushing 17 and used in the usual manner.

From the foregoing description taken in conjunction with the accompanying drawing it will be seen that an instrument of precision of simple and durable structure is provided and that the same may be used to advantage for establishing or laying off upon a piece of work the marks whereat drill holes are to be bored and that the instrument may be used for establishing other points or marks upon a piece of work with accuracy and precision.

Having described the invention what is claimed is:

1. An instrument of precision comprising two arms extending at a right angle to each other provided with an opening having the center thereof in alinement with the median longitudinal dimensions of said arms, work-engaging blocks adjustably mounted upon said arms, rods extending from said arms having their median longitudinal dimensions in alinement with the median longitudinal dimensions of said arms and in alinement with the center of said opening, and adjustable work engaging members mounted on said rods.

2. An instrument of precision comprising a member having two arms extending at a right angle to each other and provided with an opening the center of which is precisely in alinement with the median longitudinal dimensions of said arms, blocks adjustably mounted upon said arms, means for securing the blocks at adjusted positions, rods attached at their inner ends to said member, and having their median longitudinal dimensions precisely in alinement with the median longitudinal dimensions of said arms and precisely in alinement with the center of said circular opening, work engaging member slidably mounted upon the rods, and means carried by the rods for moving the work engaging members thereon.

3. An instrument of precision comprising a member having two arms extending at a right angle to each other and provided with an opening the center of which is precisely in alinement with the median longitudinal dimensions of said arms, rods attached to said member and having their median longitudinal dimensions precisely in alinement with the said longitudinal dimensions of said arm member and in alinement with the center of said opening, work engaging members carried by the rods, blocks mounted upon said arms, means for securing the blocks at adjusted positions upon the arms, blocks slidably mounted upon said arms, rods carried by the last mentioned blocks and slidably received in the first mentioned blocks, and nuts screwed upon the rods and bearing against the first mentioned blocks and adapted when rotated to move the rods longitudinally whereby the second mentioned blocks are adjusted upon said arms.

In testimony whereof we affix our signatures in presence of two witnesses.

REUBEN A. ALDEEN.
SWAN HILLMAN.

Witnesses:
ALVIN WESTLUND,
NILS LARSON.